United States Patent [19]
McCracken

[11] Patent Number: 5,840,102
[45] Date of Patent: Nov. 24, 1998

[54] MOBILE PNEUMATIC MATERIAL TRANSFER MACHINE

[76] Inventor: Hilton G. McCracken, P.O. Box 667, Bernalillo, N. Mex. 87004

[21] Appl. No.: 832,611

[22] Filed: Mar. 31, 1997

Related U.S. Application Data

[60] Provisional application No. 60/014,700 Apr. 1, 1996.
[51] Int. Cl.⁶ .................................................. B01D 50/00
[52] U.S. Cl. ............................... 95/268; 55/320; 55/337; 55/342; 55/356; 55/473; 95/273; 96/384
[58] Field of Search ............................. 55/356, 473, 467, 55/320, 324, 327, 330, 332, 334, 337, DIG. 3, 342, 343, 385.3, 276; 95/273, 268

[56] References Cited

U.S. PATENT DOCUMENTS

| | | | |
|---|---|---|---|
| 1,944,976 | 1/1934 | Hamilton | 55/356 |
| 3,008,542 | 11/1961 | Steele . | |
| 3,431,583 | 3/1969 | Daneman . | |
| 3,545,181 | 12/1970 | Young | 55/467 |
| 3,585,788 | 6/1971 | Wilson | 55/473 |
| 3,842,461 | 10/1974 | Wurster | 55/467 |
| 3,870,489 | 3/1975 | Shaddock | 55/356 |
| 3,955,236 | 5/1976 | Mekelburg | 55/467 |
| 4,017,281 | 4/1977 | Johnstone . | |
| 4,111,670 | 9/1978 | DeMarco | 55/356 |
| 4,162,149 | 7/1979 | Mekelburg | 55/356 |
| 4,218,226 | 8/1980 | Boozer | 55/356 |
| 4,227,893 | 10/1980 | Shaddock | 55/356 |
| 4,323,377 | 4/1982 | Jolin | 55/356 |
| 4,578,840 | 4/1986 | Pausch | 55/356 |
| 4,723,969 | 2/1988 | DeMarco | 55/DIG. 3 |
| 4,779,303 | 10/1988 | Duthie et al. . | |
| 4,935,984 | 6/1990 | Bryant et al. . | |
| 5,002,595 | 3/1991 | Kehr | 55/467 |
| 5,030,259 | 7/1991 | Bryant et al. | 55/356 |
| 5,062,868 | 11/1991 | Kennedy | 55/356 |
| 5,076,919 | 12/1991 | Francisco, Jr. . | |
| 5,142,732 | 9/1992 | Davis . | |
| 5,409,512 | 4/1995 | Wilkerson et al. | 55/356 |
| 5,419,006 | 5/1995 | Duthie . | |
| 5,630,247 | 5/1997 | Venia . | |

*Primary Examiner*—Duane S. Smith
*Attorney, Agent, or Firm*—Rod D. Baker; D. Goelet Kehl; Jeffrey D. Myers

[57] ABSTRACT

A material transfer apparatus and method, the apparatus having a material separating container, a filter unit, a vacuum unit and an exhaust unit, all mounted on a mobile conveyance. Air, carrying the materials to be transferred, is drawn through pneumatic tubing into the separating container where large and small materials are separated, and then into the filter where it is filtered for re-entry into the atmosphere.

22 Claims, 12 Drawing Sheets

MOBILE PNEUMATIC MATERIAL TRANSFER MACHINE

CROSS-REFERENCE TO RELATED APPLICATIONS

This application claims the benefit of the filing of provisional application Ser. No. 60/014,700, entitled "Mobile Pneumatic Material Transfer Machine", filed on Apr. 1, 1996, now abandoned and the specification thereof is incorporated herein by reference.

BACKGROUND OF THE INVENTION

1. Field of the Invention (Technical Field)

The present invention relates to a mobile apparatus and method for transferring various materials from one site to another.

2. Background Art

Many devices have been invented for moving and transferring materials and/or for cleanup of various materials. Although such machines are known, none have the requisite combination of mobility and power to be both effective and truly versatile over a wide range of industrial applications.

Machines for transfer and movement of liquid materials are known, e.g., sewer trucks, but they are not designed to work for any materials other than liquid (or sludge) without major structural changes. Previously known methods and apparatus for removal and transfer of materials are not designed to filter the air that is taken in with the material, thus causing relatively speedy destruction of both the truck(s) and the collection equipment, in addition to environmental contamination and problems that arise from the emission of the unfiltered air from the machine. Both types of machines are typically dependent on the use of positive displacement pumps for operation, which in themselves have the disadvantages of being noisy, unreliable, unable to handle heat, limited in operational velocity (cfm or pulling too many inches of mercury), high maintenance, and unable to vary speed. Also, both types of machines are slow and not particularly mobile. Neither type of machine is capable of material transfer over long distances, reversal of operation, or operation both above and below ground.

More generally, the known technology for material transfer lacks a fast, environmentally friendly, and versatile machine for transfer of a wide size range of materials over long distances and a wide variety of terrains.

SUMMARY OF THE INVENTION
(DISCLOSURE OF THE INVENTION)

The invention is an apparatus for collecting and transferring materials, comprising: vacuum means for collecting materials in an air stream; container means comprising an inlet, operably connected to said vacuum means, a tank means for receiving collected materials, a means for separating a first portion of the collected materials from said air stream, and an outlet; means for filtering said air stream, comprising an inlet operably connected to said outlet of said container means, and further comprising an outlet means for exhausting a filtered air stream from said filtering means; and exhaust means operably connected to said vacuum means for eliminating noise during the collecting of materials; wherein said vacuum means, said container means, said filtering means, and said exhaust means are all operably mounted on a mobile conveyance. The invention further consists of a method of collecting and transferring materials comprising the steps of: deriving a high velocity volume of feed air from a vacuum unit; collecting materials with said feed air; pulling said feed air into a container for separating large materials from particles; effecting an immediate loss of velocity in said feed air upon entry of the feed air bearing the materials into the separating container, whereby substantially all the collected material is separated from said feed air; passing said feed air through a filter unit for filtering said feed air for re-entry into the atmosphere, said filter unit having a first outlet for said filtered feed air and a second outlet for filtered materials; and removing materials filtered from said feed air from said second outlet for filtered materials.

A primary object of the present invention is to provide a mobile apparatus and method for transferring and cleaning up materials ranging in size from about 1 micron (baby powder size) to about 8 inches in diameter, e.g., river rock.

Another object of the invention is to provide an apparatus and method capable of moving materials a great distance, and from various sites, without consideration for terrain, e.g., elevation or obstacles (trees, buildings, etc.).

Yet another object of the invention is the provision of an apparatus and method for transfer of materials in an environmentally friendly manner, i.e., without contaminating either the air used in the collection and transfer process or the sites from or to which the material is being transferred and without risk to employees involved in the operation of the apparatus.

A primary advantage of the present invention is the provision of an apparatus and method for transferring materials, that is mobile and fast, while still being uniquely powerful and highly versatile over a broad range of applications and in a broad range of locations.

Another advantage of the present invention is the provision of an apparatus and method useful for clean up of contaminated and hazardous materials without the need for human contact and/or multiple (repeated) handling of contaminated materials, which increases the safety factor greatly.

Still another advantage of the present invention is its capability of reversal of operation.

Yet another advantage of the present invention is its ability to vary operational speed.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 3b is an end view of the separating container shown in FIG. 3a.

DESCRIPTION OF THE PREFERRED EMBODIMENTS

(BEST MODES FOR CARRYING OUT THE INVENTION)

The present invention is an apparatus and method for moving materials that allows the movement of materials a great distance from various sites, and over any variety of elevations, without regard to terrain or obstacles (e.g., trees, buildings), in an environmentally friendly, employee-safe, and speedy manner. According to the invention, the apparatus collects materials by producing a very high (vacuum/pressure) volume of air movement, then separates the collected materials by size and filters the air before its return to the atmosphere.

Figure 1:
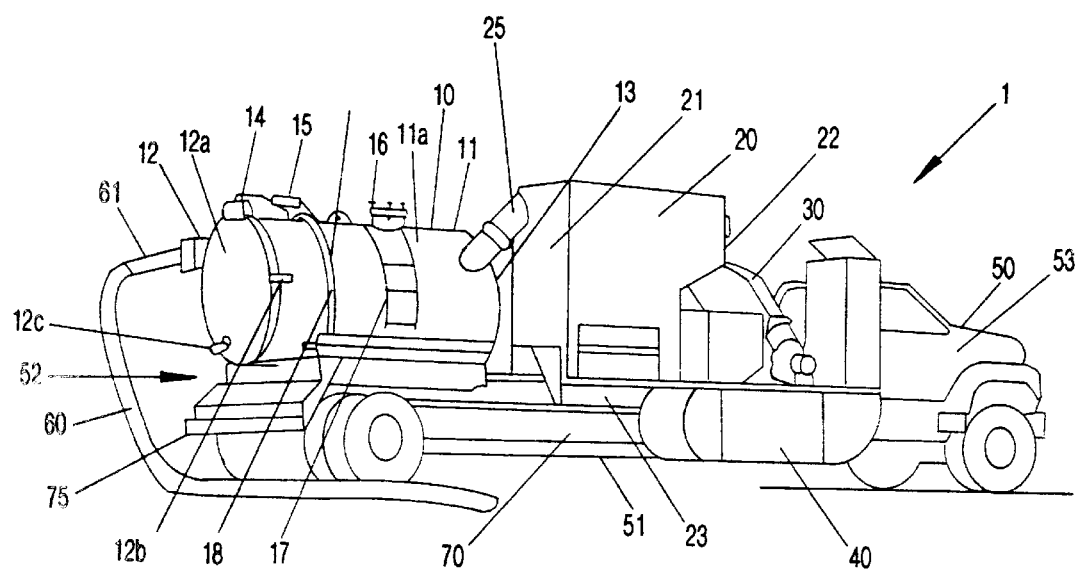
FIG. 1 is an orthogonal view of the apparatus of the invention, shown mounted on a truck.

Reference is now made to FIG. 1, which depicts the assembled apparatus 1 of the preferred embodiment of the invention. In the preferred embodiment, the apparatus comprises separating container 10, filter unit 20, vacuum unit 30, and exhaust unit 40, all mounted on a mobile conveyance 50, shown in FIG. 1 as a truck 50, with a foundation 51, i.e., truck bed 51 in FIG. 1, modified for attachment of the elements of the apparatus. Conveyance 50, shown as truck 50 in FIG. 1, may comprise a variety of modes of transportation alternative to the truck embodiment, e.g., trailer, boat, train, plane, barge, sled, drag, building or crane, or a combination thereof.

Separating container 10 is mounted at the back end 52 of truck 50 and comprises a cylindrical housing 11, which surrounds a tank 11a, mounted horizontally on truck bed 51 with its first end 12 at back end 52 and a second end 13 facing the cab 53 of the truck 50. End 12 comprises a rear door or hatch 12a for separating container 10 which may be opened (lifted up and lowered down), for either inspection or removal of materials, by swivel hinge 14 for dumping separated material. Door 12a covers the whole end 12 of container 10 and may be hydraulically operated by a first hydraulic ram 15, mounted by a bracket 15a to the top of housing 11. Separating container 10 also includes a manway hatch 16 at the top of cylindrical housing 11, which allows for viewing the inside of the container of for human entry for inspection, if necessary. Ladder 17 provides access up the side of housing 11 to hatch 16. Housing 11 is surrounded by strengthening rib 18 to enhance structural strength and stability.

Figure 2:
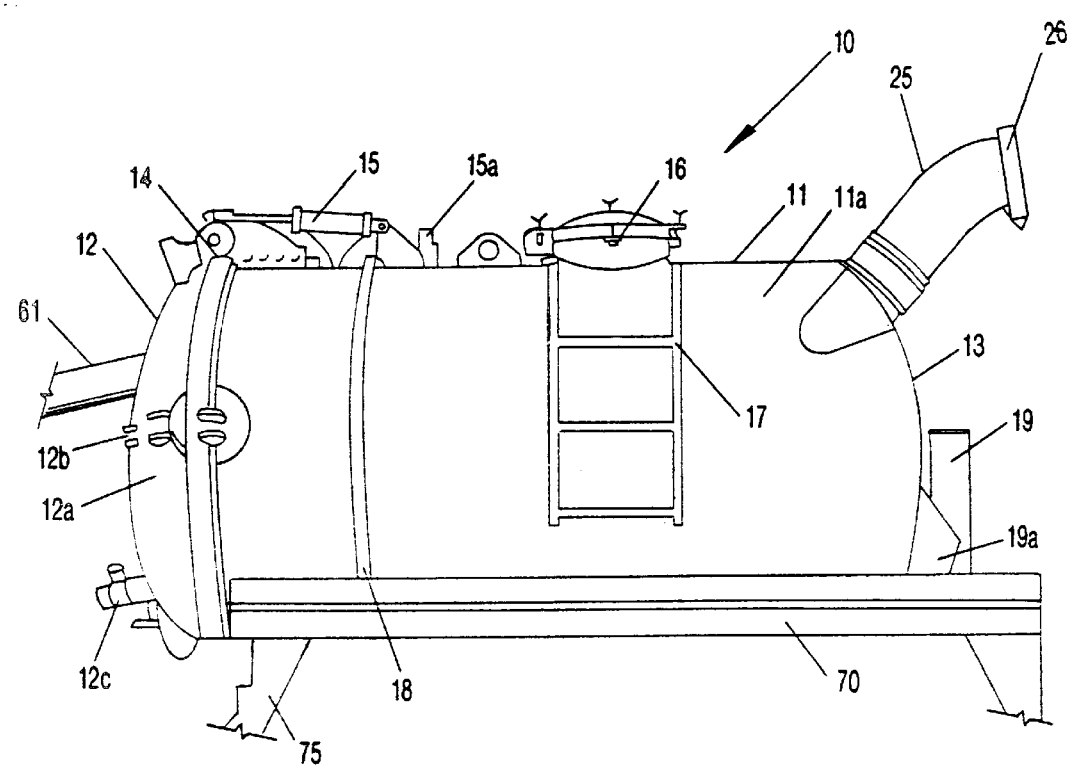
FIG. 2 is a side view of the separating container of the present invention.

FIG. 2 provides an enlarged view of separating container 10, showing inlet conduit 61, door 12a, hinge 14 mounted above door 12a, hydraulic ram 15 mounted at 15a on top of housing 11 behind and connected to hinge 14, manway hatch 16 and ladder 17. Inlet conduit 61 leads to an internal air passageway (not shown) in tank 11a that extends the length of container 10 and exhausts into filter unit 20. As seen in FIG. 2, door 12a includes locking devices 12b, which hold door 12a closed when there is positive pressure in tank 11a.

As shown in FIG. 2, end 12 additionally comprises drain 12c, which can be seen in FIG. 1 but is depicted in more detail in FIG. 2. Drain 12c is shown as small (e.g. in one embodiment, it consists of a 6-inch brass gate valve), but may be any size and may also be hydraulically opened and closed. Drain 12c allows the removal of various types of materials from the tank 11a, when, for whatever reason, the operator does not want to open the entire door 12a; for example, when collected sludge or slurry separates to liquid and solid material in the tank during operation.

FIG. 2 also clearly shows a second hydraulic ram structure 19 and its attachment (second mounting bracket) 19a to housing 11 at end 13 of container 10, neither of which are visible in FIG. 1. Second ram 19 raises and lowers container 10 for dumping from rear door 12a. In FIG. 2, it can be easily seen that the raising of container 10 by ram 19 would cause connector 25 to disengage from cradle 26 during the lifting, while the lowering of container 10 after the dump would re-engage connector 25 in cradle 26.

FIG. 2 also illustrates more clearly pipeholder 70, which in this embodiment consists of a tray with sides extending the length of container 10, for carrying pipe and/or flex tubing for transmission line 60 during transport, and rear step and bumper hitch 75, mounted to the bottom of truck bed 51, for enhancing access to container 10.

Figure 3A:
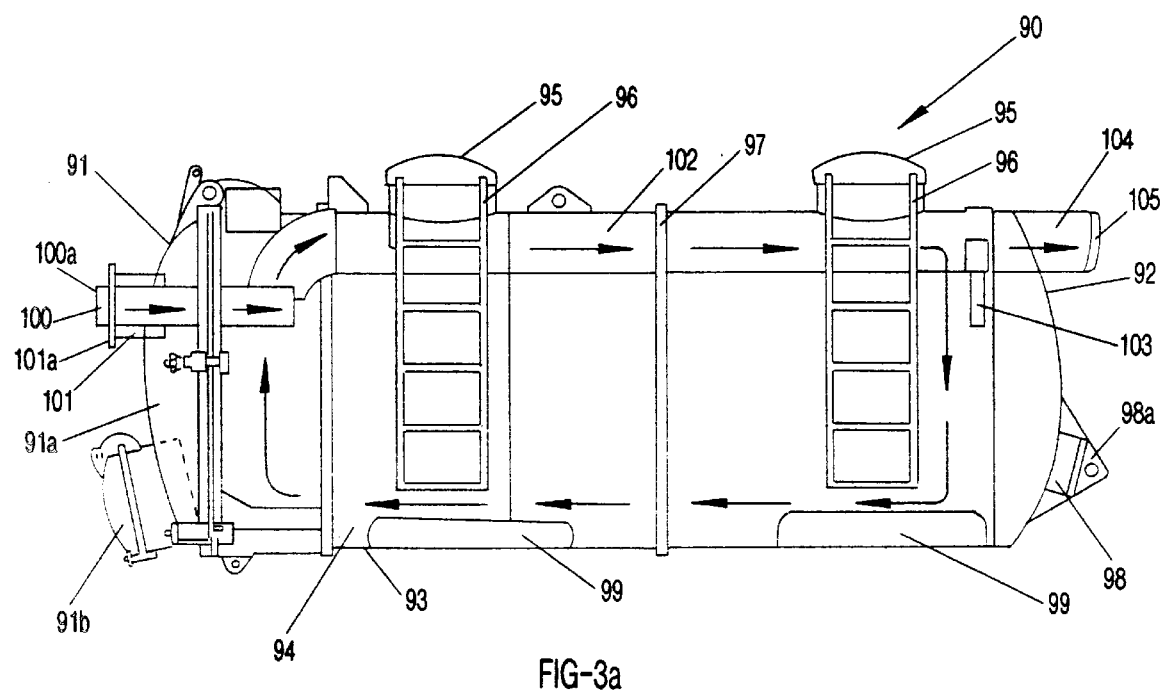
FIG. 3a is a side view of another embodiment of the separating container.

Although FIG. 2 depicts the most basic embodiment of separating container 10, various configurations and embodiments may be used for separating container 10. FIGS. 3a and b depict side and end views, respectively, of another larger embodiment shown as separating container 90, having a first end 91, a second end 92, a housing 93, a tank 94 inside housing 93, two manway hatches 95 mounted at the top of housing 93, two ladders 96, a strengthening rib 97, and two openings or hatches 91a and 91b, of different sizes, for viewing the inside of tank 94 and/or for evacuating materials from end 91 of container 10: like 12a of FIGS. 1 and 2, hatch 91a comprises the entire rear portion that is end 91; and hatch 91a is operable as a drain for materials larger than those which can pass through hatch 91b therefore hatch 91b functions as an additional manway hatch to allow viewing or human entrance into the tank. Hatches 91a–b are all hydraulically operated, by hydraulic rams not specifically shown or described, but essentially corresponding to those set out in FIGS. 1 and 2. Container 90 is lifted for dumping through either of hatches 91a–b by hydraulic ram 98 attached to container 90 by mounting bracket 98a at end 92.

Additional features of this embodiment include vibrating pads 99 for vibrators (not specifically shown) which vibrate material out of tank 94, and the inclusion of both vacuum inlet hose 100 and vacuum exhaust hose 101 at end 91 of container 90. Vacuum inlet 100a and hose 100 allows air to enter tank 94; the inlet air passes through an air passage tube 102 which acts like a cyclone, moving the air along the full length, and at the top, of tank 94, then dropping the air to the bottom of the tank, and then recirculating it upwards to exit the tank through exhaust hose 101 at outlet 101a, continually slowing the air throughout the passage. The passage of air is depicted with arrows in FIG. 3a. Vacuum inlet 100a is preferably approximately 6 inches in diameter for maximizing the speed of the intake air at inlet; exhaust outlet 101a is preferably approximately 10–12 inches in diameter for controlling the exhaust of the air at a much slower speed.

The outside portion of tube 102, returning the air to the exhaust outlet, is supported by bracket 103 on housing 93, and vacuum connector 104 attaches container 90 to filter unit 20. Connector 104 fits into cradle 105 and automatically disengages upon lifting, and re-engages upon lowering, of container 90.

Figure 3B:
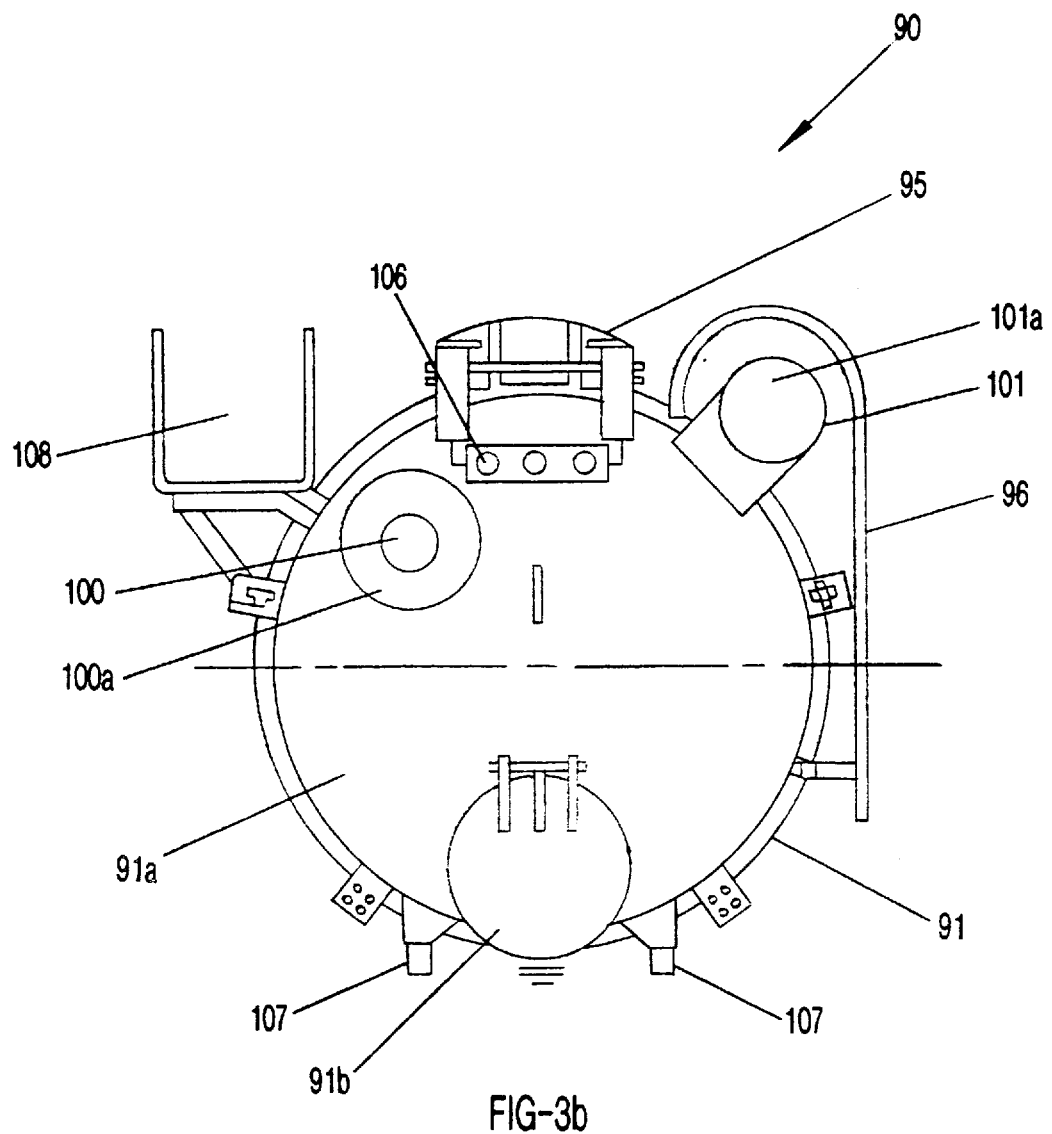

As seen in FIG. 3b, this embodiment further includes running lights 106 mounted at end, swivel brackets 107 which act as pivot points, allowing tank 94 to lift and lower, and a bracket 108 for carrying pneumatic transfer tubing mounted at the top of housing 93. Bracket 108 is essentially the equivalent in function of pipeholder 70 of FIGS. 1 and 2.

As can be seen by the previous descriptions of FIGS. 1, 2, and 3a and 3b, separating container 10 is not limited to any size, shape or material and may comprise any one of several embodiments of a "drop box" type of container; alternatively, the drop box design may be replaced by a cyclone design, or a combination of both drop box and cyclone designs. In any embodiment, inlet air entering container 10 experiences an immediate and drastic drop in air velocity, whereby the air-suspended materials and particles drop to the floor of the unit and the particle feed air is drawn out of container 10 into filter unit 20 to be totally cleaned of all contaminates.

In an alternative embodiment, separating container 10 comprises a mobile drop box design (not shown), still not limited to any size, shape or material, but designed to be lifted and/or placed over a receiving container. In this embodiment, a mobile vacuum unit is connected to either of the ends of the mobile drop box so the materials being transferred and deposited into the receiving container do not have to be handled more than once, which eliminates the possibility of contamination of the materials, contamination of the operator, and/or contamination of the atmosphere. The mobile drop box embodiment is for use with a crane unit (not shown) specially designed to reach long distances. The crane unit has a limited weight capacity and is used for the placement of the various elements of the mobile pneumatic material transfer machine, such as the mobile drop box.

Another alternative embodiment is the disposable drop box (not shown), again not limited as to size, shape or material, and again designed to cause a drastic velocity drop in the air flow. In this embodiment, separating container 10 comprises a disposable drop box in which materials and particles are deposited, thus eliminating any repeated handling of the material. Further, the disposable drop box can be placed anywhere in the pneumatic transmission line so that materials will dispense into it (without re-handling). When the requisite materials are collected, drop box is disposed of at an environmentally acceptable and legal location. This alternative is especially valuable for hazardous material transfers.

Referring again to FIG. 1, filter unit 20 is mounted on truck 50 at end 13 of separating container 10, i.e., the end nearest the truck cab 53, and is operably connected to separating container 10 by a vacuum connector 25. Filter unit 20 comprises housing 20a, ends 21, where connector 25 is attached, and 22 and bottom 23 (only partially shown in FIG. 1) through which filtered material is dumped into an attached container (not shown). As seen more clearly in FIGS. 2 and 4a, filter unit 20 further comprises a cradle 26 into which vacuum connector 25 connects and fits for support during the operation of the invention. When ram 19 raises container 10 for dumping tank 11a, vacuum connector 25 automatically disconnects from cradle 26 during the dumping and automatically reconnects when container 10 is lowered.

Figure 4A:
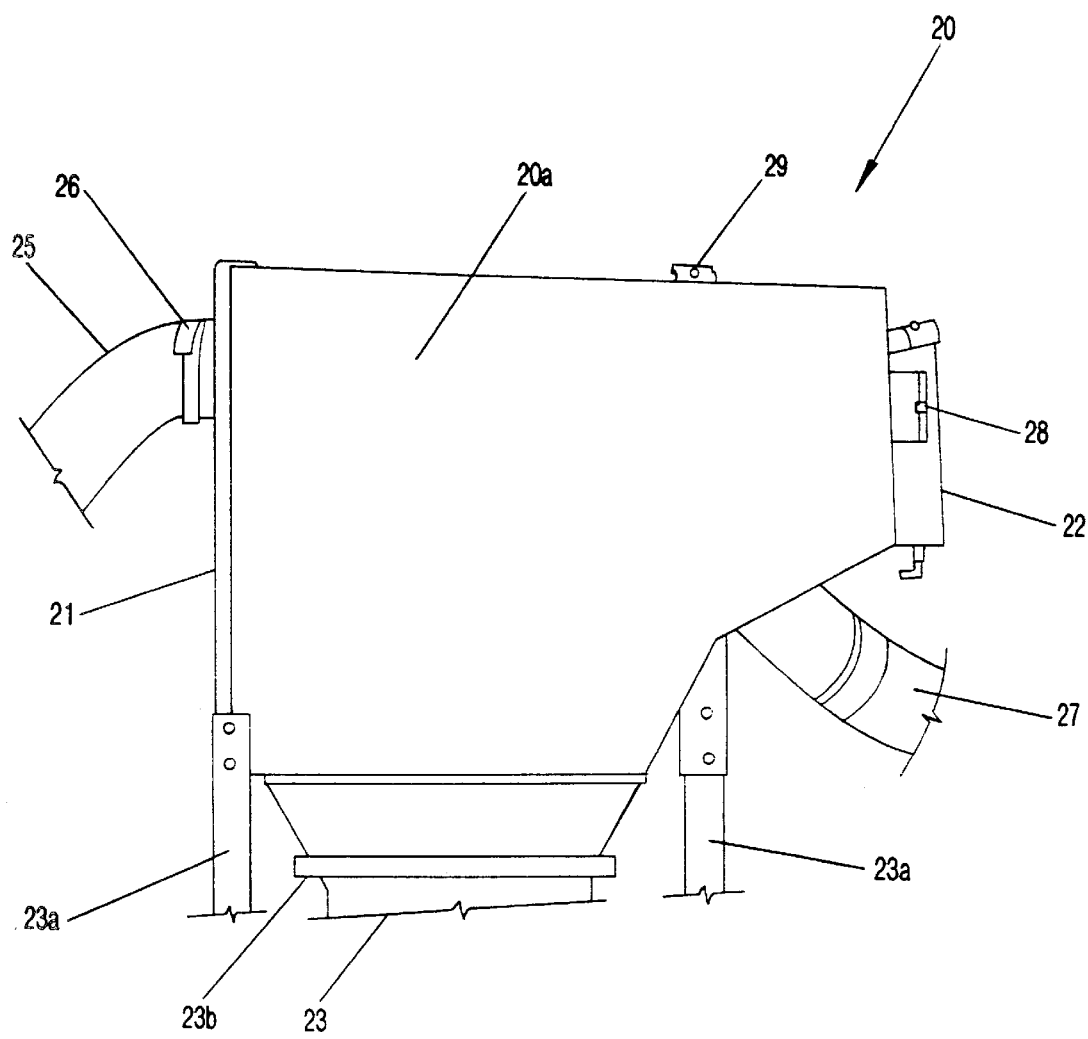
FIG. 4a is a side view of the filter unit.

In one embodiment, shown in FIG. 4a, filter unit 20 further comprises legs 23a for lifting filter unit 20 and slide gate 23b, both positioned at bottom 23, which allow for dumping material collected in the filter out bottom 23 into an attached container. Filter unit 20 further comprises air transmission tube 27 attached at the lower portion of end 22, which connects filter unit 20 to vacuum unit 30, and purging unit 28, also attached to filter unit 20 at end 22. Purging unit 28 comprises an air driven unit to clean the filters 20b located inside the housing (not shown in FIG. 4a). Purging unit 28 may also be electrically sequenced, as well as air driven, and is operably connected to the transmission tube 27 to vacuum 30, which is used as a blower during purging operations. Finally, filter unit 20 includes lifting hook 29 attached to the top of housing 20a for lifting filter unit 20 during dumping through bottom 23.

Figure 4B:
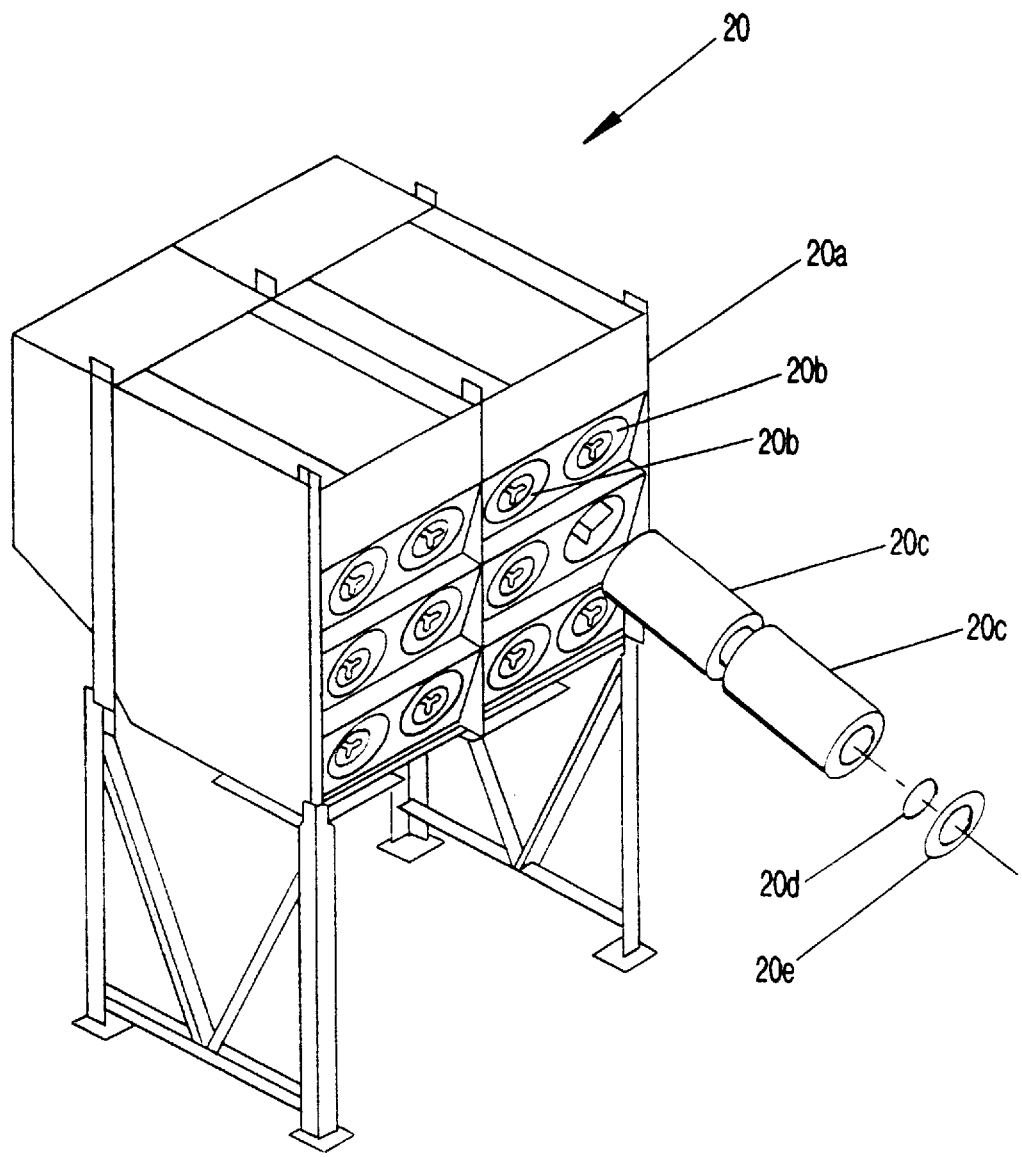
FIG. 4b is an orthogonal view in cross-section of the filter unit.

FIG. 4b depicts filter unit 20 in cross-section, showing filters 20b, which number twelve in the illustrated embodiment but are preferably four in number. Filters 20b are changeable and may comprise filter material designed to filter feed air to sizes as low as 1 micron (i.e., cleaner than the air we breath). FIG. 4b also includes an exploded view of one filter 20b showing the filter cartridges 20c, the filter lid 20d, and the o-ring 20e used to hold each filter lid 20d.

Figure 4C:
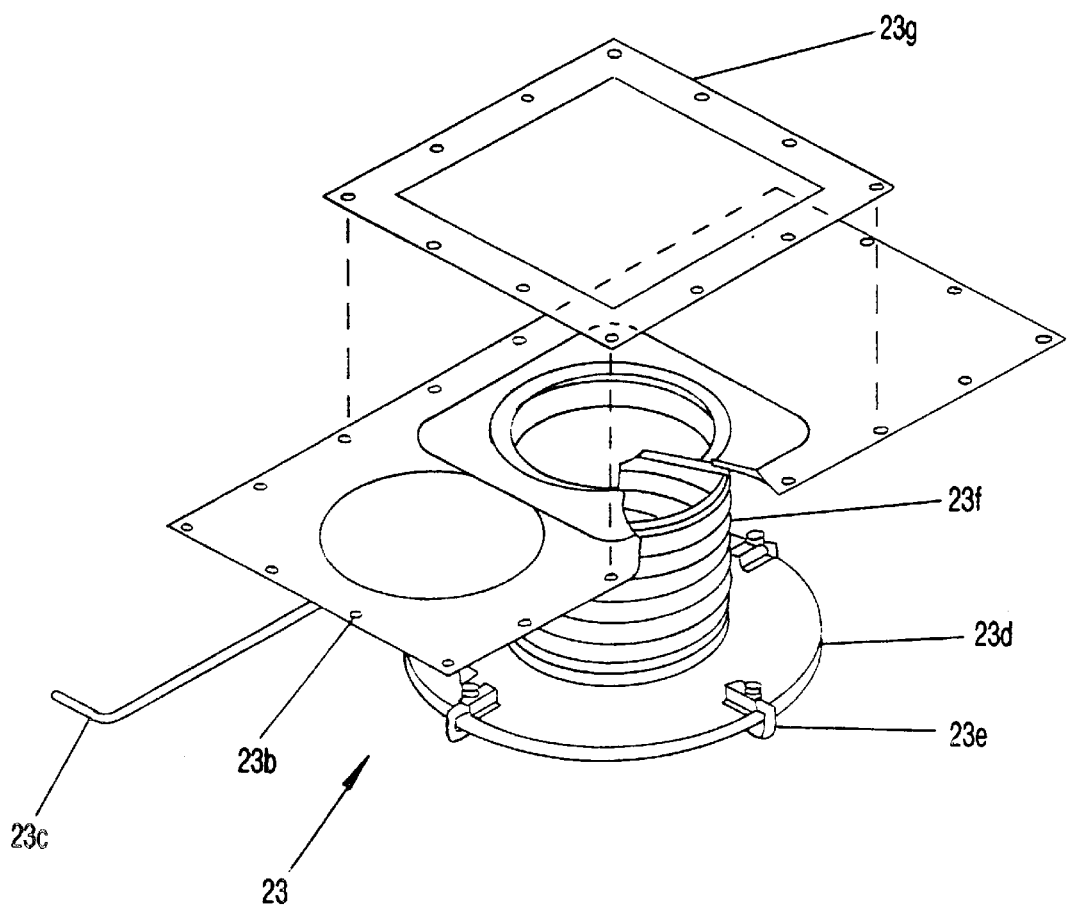
FIG. 4c is an orthogonal exploded view of the bottom of the filter unit.

FIG. 4c illustrates the bottom 23 of filter unit 20, comprising slide gate 23b, handle 23c for manually pushing or pulling slide gate 23b, connecting unit 23d that fits on the container for receiving the material that is dumped from the filter unit 20, e.g., a 55 gallon drum, connecting clips 23e for locking unit 23d to the chosen receiving container (not shown), flex hose 23f that connects filter unit 20 to connecting unit 23d, and gasket 23g, for attaching slide gate 23b to bottom 23 of filter unit 20. In operation, material that does not drop out in separating container 10, consisting of fine, powder-sized dust, enters filter unit 20 and is filtered there and finally dumped into the receiving container that is attached at connecting unit 23d.

Additional embodiments of the basic filter unit 20 are comprised in this invention. Basic filter unit 20 is not limited as to size, shape or dimension, but in one embodiment, the filters 20b must be specially designed to filter to minimicron sizes. Another alternative embodiment of filter unit 20 comprises a hazardous filter unit, which is constructed of a material that resists contamination from material deposits that would normally penetrate the unit's surface. (Such materials may include, but are but not limited to, stainless steel, chrome or powder coated materials.) Again, in this embodiment, the hazardous filter unit 20 also comprises disposable filters that can be safely removed (bag to bag) and disposed of at a legal, environmentally-acceptable location. Further, the housing for hazardous filter unit 20 is designed to be easily accessible for hand-wipe decontamination.

Referring again to FIG. 1, vacuum unit 30, which is mounted on truck bed 51 in front of filter unit 20, is designed to create a suction of high volume air, entering separating container 10 through pneumatic transfer tube 60, which is attached to separating container 10 at end 12 by means of inlet conduit 61; tube 60 and conduit 61 together form the intake line for the high-volume air suction by which materials are collected and transferred and intake or feed air is passed to filter unit 20 for cleaning. Vacuum unit 30 comprises a pressure unit with fan (not shown in FIG. 1), designed to develop a high volume of air flow with comparatively low inches of Mercury column. The design for vacuum unit 30 may be any configuration that does not produce low volumes of air flow with high inches of Mercury column, as is typical of a "vane"-type compressor.

Figure 5A:
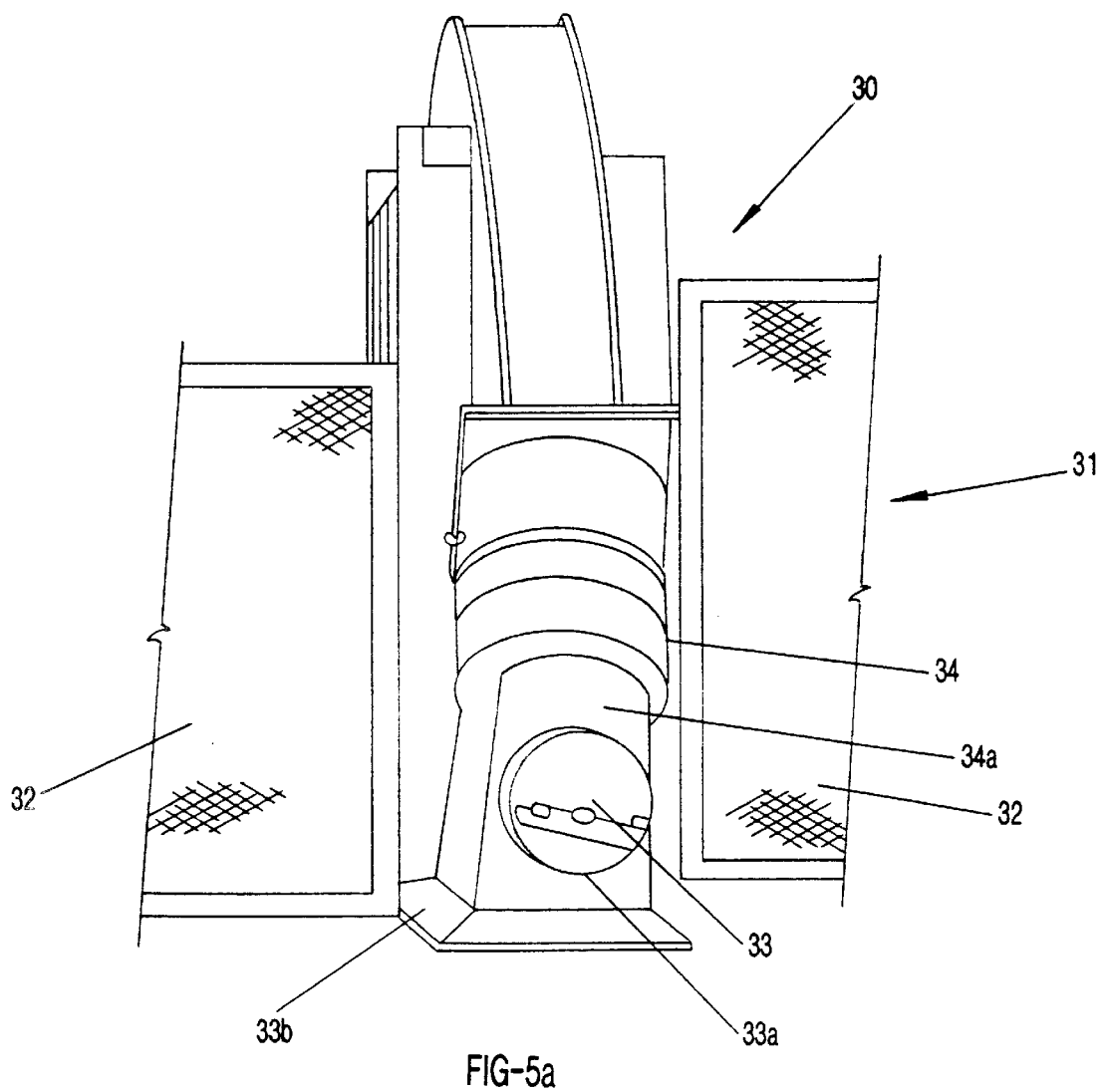
FIG. 5a is an orthogonal view of the vacuum unit.

As shown in more detail in FIG. 5a, vacuum unit 30 comprises a front side 31, including mesh protection 32 for operators of the unit 1, a fan 35 (not shown in FIG. 5a), a blower 33 with lid 33a and a plate 33b removably connecting to exhaust unit 40. In operation, vacuum unit 30 is designed to run off either positive pressure (for blowing) or negative pressure (for suctioning) thereby allowing the process of the invention to be reversible. As depicted in FIG. 5a, plate 33b slides into place under the blower, and, in combination with blower lid 33a, allows positive pressure to build up in the line 34a, inside its housing 34, which connects to the fan 35. When plate 33b is not inserted, air in the line 34a goes into the exhaust unit 40.

Figure 5B:
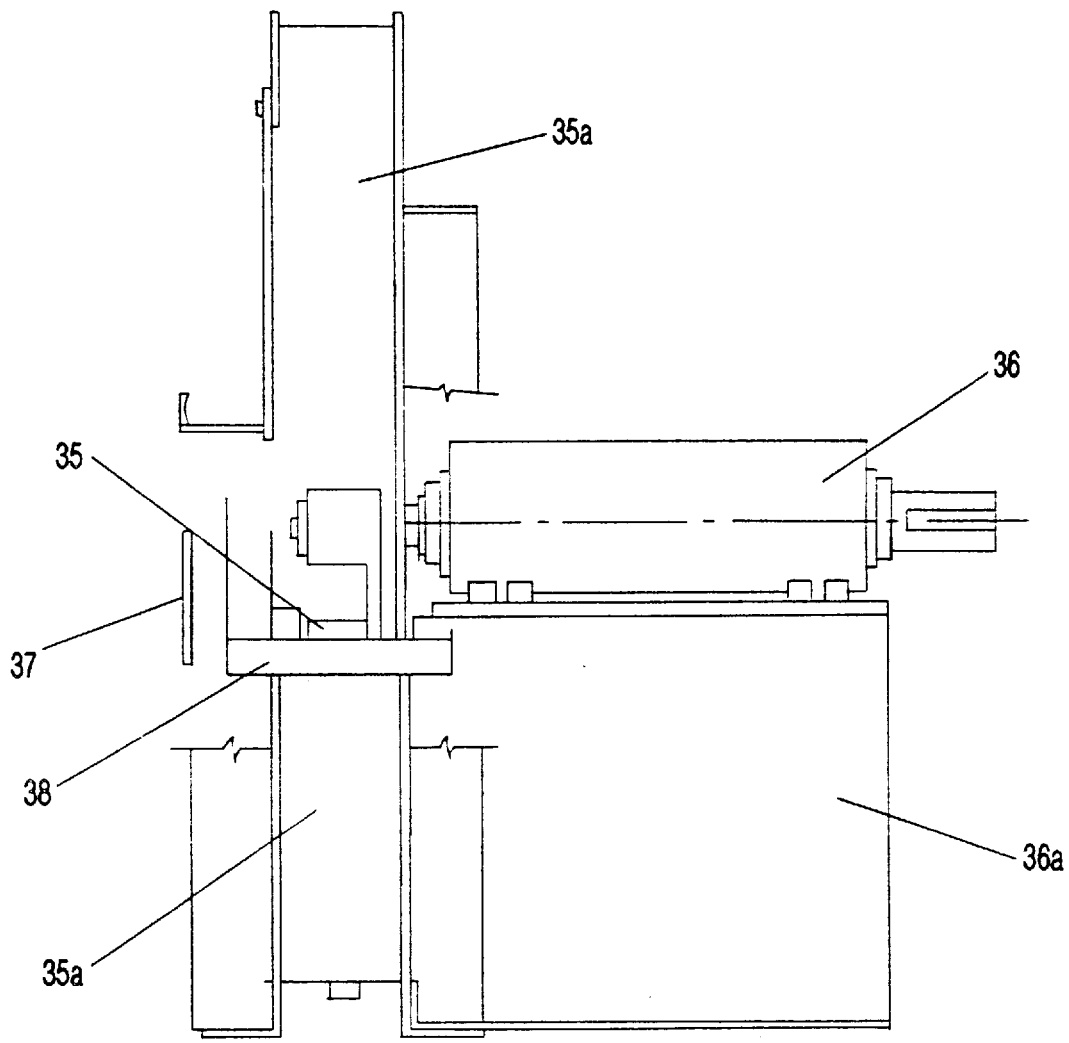
FIG. 5b is a side view of the fan housing of the vacuum unit
Figure 5C:
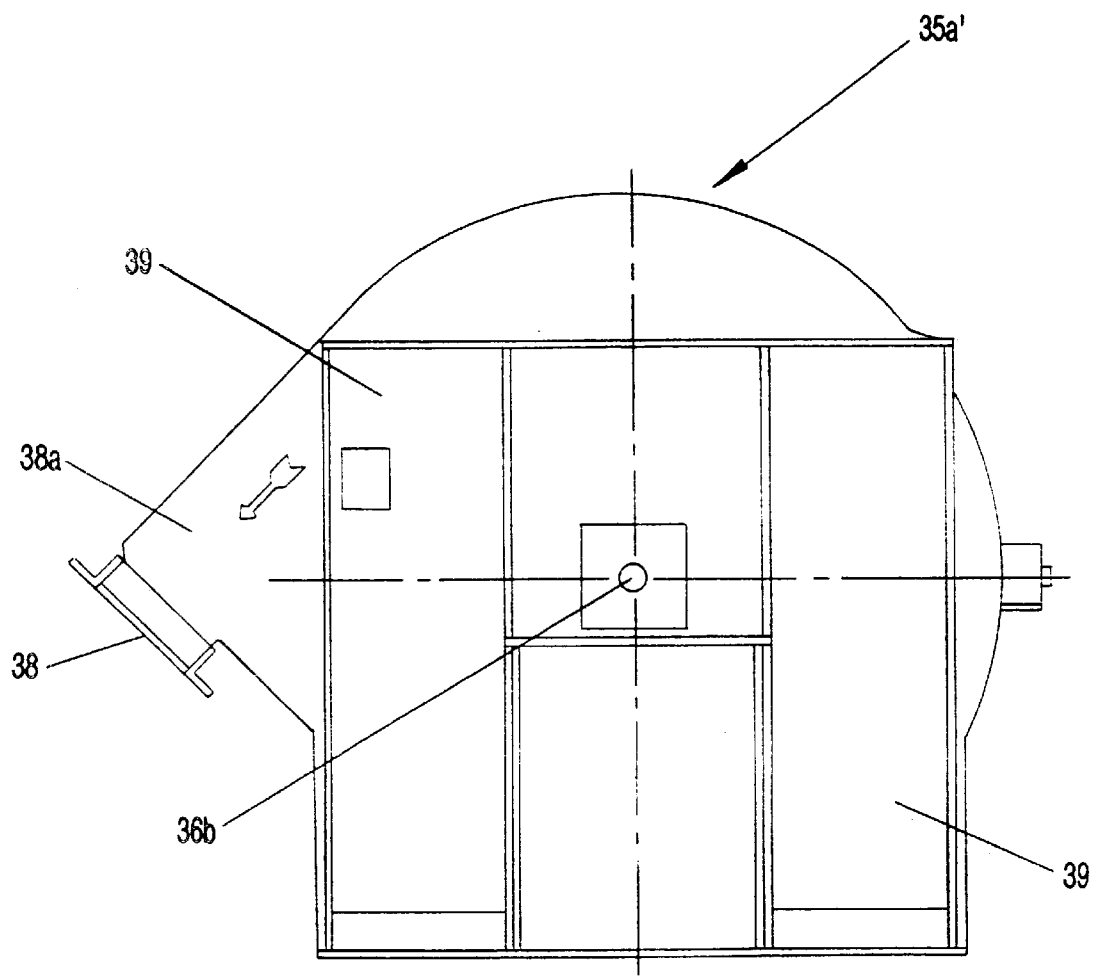
FIG. 5c is an end view of the fan housing from the back side.
Figure 5D:
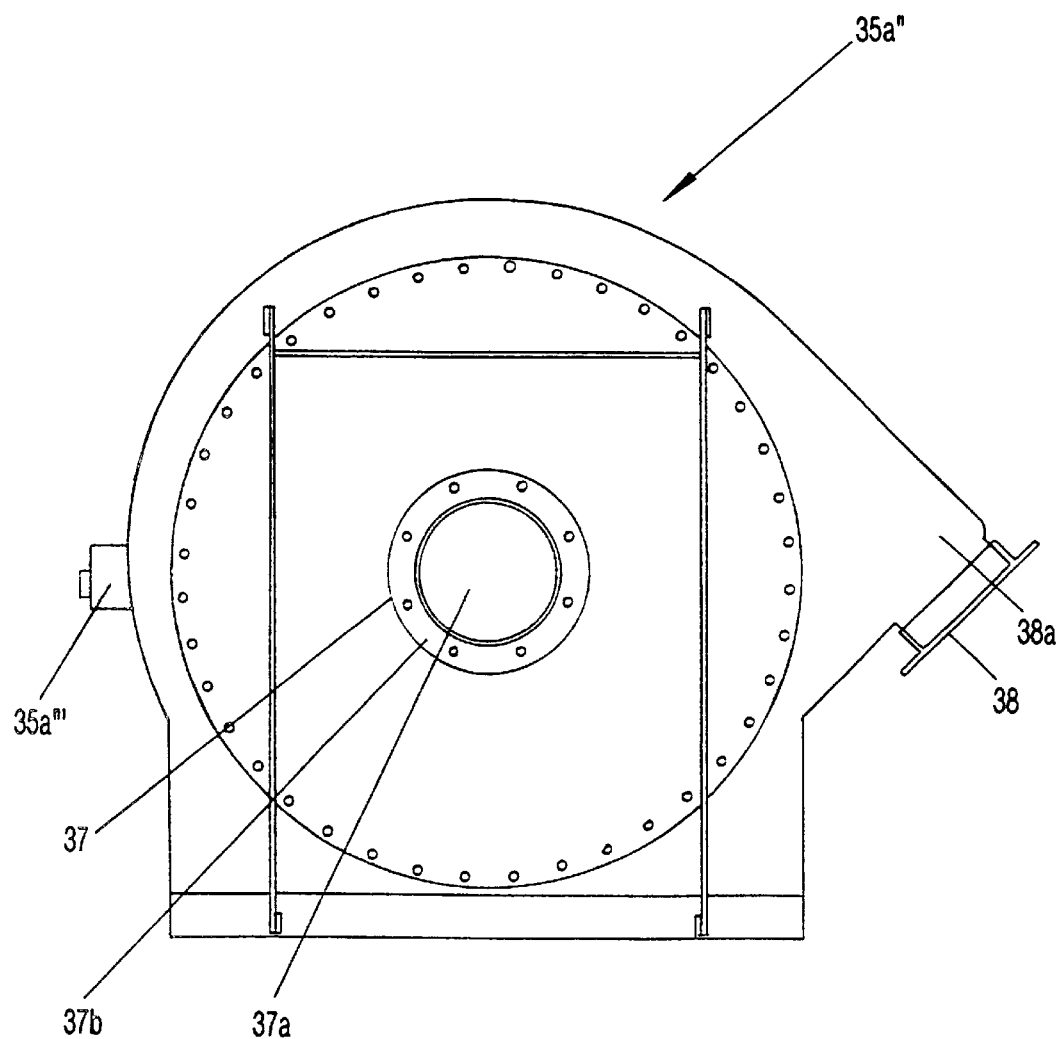
FIG. 5d is an end view of the fan housing from the intake side.

FIG. 5b illustrates a side view in partial cutaway of fan housing 35a, attached to the motor 36 that runs the fan 35, with intake inlet 37 and exhaust outlet 38. Motor 36 is mounted on motor stand 36a, and is preferably be a hydraulic motor in this embodiment. FIG. 5c depicts the back side 35a' of fan housing 35a, the exhaust line 38a and outlet 38 for the fan 35, drive shaft 36b for motor 36, and braces 39 for motor 36 and fan housing 35a, which act as reinforcement against oscillation. FIG. 5d depicts the front side 35a" of fan housing 35a, showing inspection cap 35a''', attached to housing 35a, which is removable for viewing fan 35 inside fan housing 35a. Also shown is intake inlet 37, with mounting bracket 37b, which is the entrance to intake line 37a. Exhaust line 38a and outlet 38 are shown as well.

Figure 6:
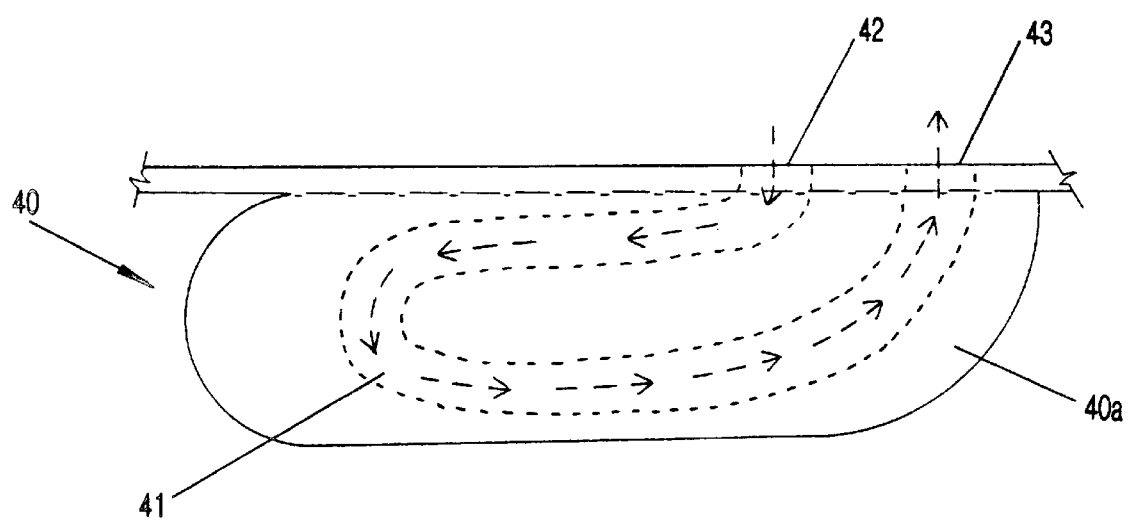
FIG. 6 is a cross-sectional view of the exhaust unit.

Referring again to FIG. 1, exhaust unit 40 is mounted on the side of truck 50 below truck bed 51 and in front of and below filter unit 10. FIG. 6 is a cross-sectional view of exhaust unit 40, comprising housing 40a, internal exhaust line 41 beginning at air inlet 42, and exhaust outlet 43. Exhaust line 41 is operably connected to vacuum line 34a of vacuum unit 30 at the insertion point for plate 31b. Air from line 34a travels through exhaust line 41 as shown by the arrows in Figure, continually losing velocity, to exit at outlet 43. Exhaust unit 40 is specially designed to eliminate noise, which advantage is obtained by the structure shown in FIG. 6: exhaust unit 40 substantially slows down the exhaust air and changes its direction several times, which drops the decibel level from the 120 db level to the low 80 or 90 db level. Additionally, exhaust unit 40 comprises the inclusion of silencing material surrounding exhaust line 41. Unit 40 is also designed to be readily disassembled for hand-wipe decontamination and replacement of the sound deadening materials inside. In one embodiment, exhaust unit 40 comprises a muffler type design.

Referring again to FIG. 1 and the overall machine 1, pneumatic transfer tube 60 can be of any durable material suitable for this use, such as, but not limited to, rubber, vinyl, PVC, aluminum, brass, copper, plastic, steel, wood, glass, paper, cardboard, or rock. Inlet conduit 61 may be of any appropriate durable material, but is preferably formed of a flexible material, e.g., flex hose, that is also abrasive resistant. Inlet conduit 61 is further designed to be of a small diameter (e.g., 6 inches in diameter) compared to vacuum connector 104 (e.g., 10–12 inches in diameter) connecting separating container 10 to filter unit 20. The smaller diameter of inlet conduit 61 enhances the high volume velocity entry of intake air bearing collected materials into the container 10, while the larger diameter of vacuum connector 104 provides for the low volume exit of the intake air, freed of separated materials, to filter unit 20.

In the method of the preferred embodiment, a volume of feed air, derived from vacuum unit 30, and moving at approximately 0 to 20,000 cubic feet per minute, is drawn through hundreds of feet of pneumatic transfer tubing 60 into the separating container 10 for separating large material from small particles, and then through filter unit 20, where the air is filtered for re-entry into the atmosphere, and the filtered material is removed from an outlet at bottom 23 beneath the truck. Entry into the separating container 10 effects an immediate loss of velocity, in which substantially all the collected material drops out except fine powder. In connection with FIGS. 1 and 2, although separating container 20 is not limited as to size or performance parameters, the container 20 portrayed in FIGS. 1 and 2 comprises a 1500 gallon volume and is capable of pulling 6.5 yards in velocity. In contrast, the container 90 of FIGS. 3a and 3b comprises a 2500 gallon volume and is capable of pulling 12.5 yards in velocity.

Choice of power sources for the mobile pneumatic material transfer machine may include: nuclear, atomic, human, compressed air, vacuum, water, water over electric, electric over hydraulic, hydraulic over electric, DC power, AC power, AC/DC combination, air over hydraulic, hydraulic over air, gas over electric, diesel over electric, solar, steam, wind, rain, hydraulic, diesel, gas, chain, transmission, power take-off, or any combination thereof.

Industrial Applicability:

Use of the mobile pneumatic material transfer machine is envisioned for the following industries and markets: wheat; rice; corn; soybeans; cash grains; cotton; tobacco; sugar cane; Irish potatoes; field crops; bean farms; current farms; grape farms; tree nuts; lime groves and farms; apricot orchards; fruits and tree nuts; sod farms; food crops under cover; millstone quarrying; cattle feedlots; cattle-raising farms; chicken eggs; dairy farms; broiler-fryer; turkey and eggs; poultry hatcheries; poultry eggs; fox farms; burro farms; catfish farms; dog, cat and rattlesnake farms; general farms; soil preparation; crop planting; crop harvesting; almond hulling; cotton ginning; cleaning poultry crops; lawn care; barks gathering; firefighting forest; miscellaneous marine products; fish hatcheries; siderite mining, beryl mining; iron ores; copper ores; lead and zinc ores; gold and silver ores; silver ores; carnotite mining; ferroalloy ores; cerry orchards; metal mining services; uranium ores; miscellaneous metal ores; bituminous coal surface mining; bituminous coal underground mining; anthractic mining; coal mining services; coal pyrolysis at mine site; drilling oil/gas wells; oil/gas services; dimension stone; crushed and broken lime stone; crushed and broken granite; crushed and broken stone of all types; construction sand and gravel; industrial sand; kaolin mining; bentonite mining; blast sand mining; potash, soda and borate minerals; phosphate rock; chemical and fertilizer mineral mining; non-metallic mineral mining; miscellaneous non-metallic minerals; general contractors industrial; general contractors nonresidential; highway and street construction; bridge, tunnels and elevated highway construction; water, sewer, pipeline and communication; heavy construction; roofing, siding and sheet metal; culvert construction; water well drilling; excavation work; wrecking and demolition work; dismantling industrial equipment; special trade contractors; dried meats; creamery butter; natural processing; condensed dairy products; ice cream; cured meats; fruit pie mixes; dried and dehydrated mixes; cherries brine; dried citrus pulp; flour and grain mill products; cereal breakfast foods; rice milling; prepared flour mixes; corn starch; dog and cat food; prepared feeds; bread and other bakery products; cookies and crackers; cane sugar refining; beet sugar; candy; chocolate and cocoa products; salted and roasted nuts and seeds; soybean farms and grits; fish meal; malt beverages; malt; powdered drinks; macaroni products; roasted coffee; potato chips; macaroni, spaghetti, and other pasta; baking powder; cigarettes; cigars; tobacco stemming and re-drying; broad-woven fabric mills cotton; broad-woven fabric mills silk; tire cord fabrics; fish net mills; bagging jute; sawmills and planing general; special products sawmills; millwork; wood kitchen cabinets; hardwood veneer and plywood; softwood veneer and plywood; structural wood members; nailed boxes; wood pallets; wood containers; bath salts; miscellaneous wood products; reconstituted wood products; wood products; wood housing furniture not upholstered; wood housing furniture upholstered; wood office furniture; office furniture except wood; public building and related furniture; wood office and store furniture; office and store fixtures; drapery hardware; furniture and fixtures; pulp mills; paper mills; paperboard mills; setup paperboard boxes; corrugated and solid fiber boxes; fiber cans, tubes, drums and similar items; sanitary food containers; board chips; engraving copper; caustic potash; animal black; aluminum oxide; plastic materials and synthetic fibers; synthetic rubber; cellulosic manmade fibers; manmade organic fibers; herb grinding; pharmaceutical preparation; soap and other detergents; specialty cleaning, polishing preparations; calcium salts; perfumes, cosmetics and other toiletries; calcimines; chestnut extract; color pigments organic; alcoholic, fatty; nitrogenous fertilizers; phosphatic fertilizers; fertilizer mixing; pesticides and agricultural chemicals; iron cement; explosives; carbon black; chemicals and chemical preparation; petroleum refining; road materials; cups plastic; glass products; cement hydraulic; concrete block and brick; concrete products; ready-mix concrete; lime; gypsum products; curbing granite; abrasive products; asbestos products; barium ground; bauxite bricks; steel works; molybdenum silica; strip steel; castings graphite; malleable iron foundries; steel foundries; primary smelting of copper; primary production of aluminum; primary smelting of nonferrous metals; secondary smelting of nonferrous metals; bars, copper; bars, aluminum extruded; bars, aluminum rolled; bars, lead; aluminum die casting; non-ferrous die-casting (except aluminum); aluminum foundries; copper foundries; non-ferrous foundries; aluminum atomized powder; baseboards, metal; annealing boxes; hammer forgings mill; aluminum forging; electro-plating; coating and engraving; shot, BB's; water turbines; barn cleaners; elevators and moving stairs; batching plants, bituminous; cars, mining; conveyors and equipment; overhead traveling cranes; tunnel kiln cars; beaders, metal; sand cores; billet mills; bronzing and dust machines; malt mills; air cleaning; raceways; barges building; railroad car rebuilding; absorbent cotton; crayons and chalk; carbon paper; down feathers; railroads line hauling; railroad switching; local and suburban transit; local passenger transportation; local trucking without storage; trucking except local; local trucking with storage; courier service; farm products warehousing; general warehousing; special warehousing; canal barge operations; ship hole cleaning; boat yards; cargo salvaging; coal pipeline operation; cleaning railroad cars; cleaning railroad ballast; utilities, combined; refuse systems; vacuuming airport runways; aluminum bars; crushing and pulverizing; bag reclaiming; bullion silver produced at mine; carbon paper wholesale; cardboard and products; dairy products dealers; cleaning food; beans, dried; nuts salts manufacturing; beet pulp, dried; metal slates; agricultural limestone; sand and gravel dealers; bulbs and seed; coal dealers; hotels and motels; building cleaning; firefighting service; catch basin cleaning; racing, including track operation; public golf courses; amusement parks; horse shows; testing labs; residential farms non-commercial; fire departments; waste management; and the Armed Forces.

More specifically, the apparatus and method of the invention is useful for the following activities: transporting of any materials, including contaminated and hazardous waste (e.g., removal of carbon from filters, removal of contaminated soil from ravines); separating rock from dirt so both can be recycled; removing (blowing out) smoke from buildings; maintenance work on industrial sites; dredging for minerals; searching for lost items in pipes; removing rock from roofs or putting rock on roofs; transferring fish; hunting for personnel in cave-ins (i.e., removing dirt, sand or rocks from cave-ins to recover workers); filling air bags or balloons; and collecting and separating lead in clean-up of firing ranges.

Possibilities for using the apparatus of the invention in cleaning efforts are limitless. The invention is useful for cleaning: spills (e.g., separating oil and other contaminated spills from the top of liquid or dry areas); contaminated air (to a 1-micron level); debris from commercial sites and silos (e.g., cleaning shavings, dust, debris and excess materials from manufacturing sites); residue out of railroad cars/trucks/ships and/or airplanes (e.g., transferring materials from a wrecked truck(s) or train(s) to an operational vehicle (s)); equipment (including turbines, e.g., clean-up of exploded electric turbines); tunnels; plugged pipes or culverts (e.g., cleaning drainage pipes or areas that have filled with debris, sand and/or dirt); and elevators (e.g., removal of debris from sunken elevator shafts). It may be used for clean-up after sand blasting or demolition, for clean-up in mines (e.g., gypsum/coal/copper/silver/gold/lime and salt), for cleaning cement and coal-generating plants, and for cleaning around electrical transformers.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, and of the corresponding application(s) are hereby incorporated by reference.

What is claimed is:

1. An apparatus for collecting and transferring materials, comprising:

a foundation;

vacuum means mounted upon said foundation for collecting materials in an air stream;

container means, pivotally bracketed to said foundation, for receiving collected materials, said container means comprising a vacuum inlet, means for separating a first portion of the collected materials from the air stream, and an exhaust outlet;

means for raising and lowering said container means with respect to said foundation;

means, mounted upon said foundation apart from said container means, for filtering said air stream, said means for filtering comprising a filter inlet connectable to said exhaust outlet of said container means, and further comprising a means for transmittiing a filtered air stream from said filtering means;

automatic means for disconnecting and reconnecting said filter inlet from said exhaust outlet of said container means when said container means is raised and lowered, respectively; and exhaust means operably connected to said vacuum means for reducing noise during the collecting of materials, wherein said vacuum means is operably connected to said means for filtering, and said container means, said filtering means, said vacuum means, and said exhaust means are all mounted on a mobile conveyance.

2. An apparatus according to claim 1 wherein said vacuum means for collecting comprises a high volume low pressure fan.

3. An apparatus according to claim 1 wherein said means for separating comprises means for slowing the air stream.

4. An apparatus according to claim 3 wherein said means for slowing comprises means for recirculating the air stream in said container means.

5. An apparatus according to claim 4 wherein said exhaust outlet defines a diameter greater than a diameter defined by said vacuum inlet.

6. An apparatus according to claim 3 wherein said means for slowing comprises an air cyclone tube.

7. An apparatus according to claim 1 wherein said means for filtering further comprises a housing and a plurality of filters disposed in said housing.

8. An apparatus according to claim 6 wherein said means for filtering further comprises gate means for dumping material from within said housing, and means for connecting a receiving container to said housing in communication with said gate means.

9. An apparatus according to claim 1 wherein said exhaust means comprises means for slowing an exhaust air stream.

10. An apparatus according to claim 9 wherein said means for slowing comprises a curved exhaust line.

11. An apparatus according to claim 1 further comprising:

at least one hinged hatch on a first end of said container whereby to dump material in said container through said hatch when said container is raised.

12. A mobile apparatus for collecting and transferring materials, comprising:

a foundation;

a substantially closed container, pivotally bracketed to said foundation, for receiving materials, said container comprising an exhaust outlet;

means for raising and lowering said container with respect to said foundation;

means for filtering mounted upon said foundation apart from and in fluid communication with said container, said means for filtering comprising a filter inlet;

a cradle upon said filter inlet;

a connector upon said exhaust outlet, engaged with said cradle when said container is lowered and disengaged from said cradle when said container is raised;

a tube in fluid communication with said container;

vacuum means, mounted upon said foundation, for moving an air stream through said tube, through said container, and through said filtering means;

means for slowing the movement of the air stream through said container; and exhaust means, operably connected to said vacuum means, for muffling exhaust noise of the air stream;

whereby materials are collected in the air stream for movement through said tube to said container and from said container to said filtering means, and wherein gravity separates at least some of the material from the air stream when the movement of the air stream is slowed.

13. An apparatus according to claim 12 wherein said vacuum means comprises a high volume low pressure fan.

14. An apparatus according to claim 12 wherein said means for slowing comprises a vacuum inlet in said container, and wherein said exhaust outlet defines a diameter greater than a diameter defined by said vacuum inlet.

15. An apparatus according to claim 14 wherein said means for slowing further comprises an air cyclone tube.

16. An apparatus according to claim 12 wherein said means for filtering comprises a housing and a plurality of filters disposed in said housing.

17. An apparatus according to claim 16 wherein said means for filtering further comprises gate means for dumping material from within said housing, and means for connecting a receiving container to said housing in communication with said gate means.

18. A method of collecting and transferring materials, comprising:

generating an air stream;

collecting materials in the air stream;

receiving collected materials in a container, the container comprising a vacuum inlet and an exhaust outlet;

separating a first portion of the collected materials from the air stream in the container;

filtering the air stream with a filter unit comprising a filter inlet connected the exhaust outlet of the container means;

transmitting a filtered air stream to an air exhaust;

raising the container to dump collected materials therefrom and to automatically disconnect the filter inlet from the container exhaust outlet;

lowering the container to reconnect the filter inlet with the container exhaust outlet; and reducing noise in the exhaust.

19. A method according to claim 18 wherein separating comprises slowing the air stream.

20. A method according to claim 19 wherein slowing comprises recirculating the air stream in the container.

21. A method according to claim 20 wherein recirculating the air stream comprises exhausting the air stream from the container via an outlet having a diameter greater than a diameter defined by the vacuum inlet.

22. An apparatus according to claim 20 wherein slowing comprises moving the air stream through an air cyclone tube.

* * * * *